Feb. 15, 1966        C. C. BARBER        3,234,654
OPTICAL DEVICE FOR CHECKING ACCURACY OF SHAPE
Filed Dec. 3, 1959        3 Sheets-Sheet 1
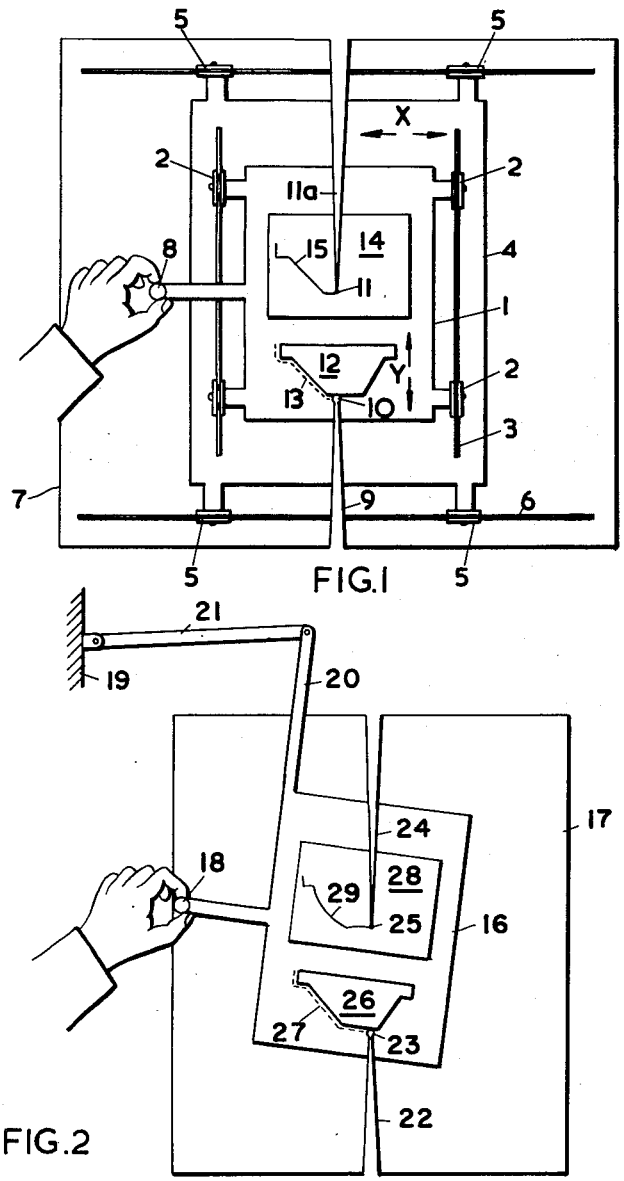
Inventor
CLIFFORD CHARLES BARBER
By
Attorney Feb. 15, 1966 C. C. BARBER 3,234,654
OPTICAL DEVICE FOR CHECKING ACCURACY OF SHAPE
Filed Dec. 3, 1959 3 Sheets-Sheet 3

CLIFFORD C. BARBER
*Inventor*

By Larsen and Taylor
Attorneys

United States Patent Office 3,234,654
Patented Feb. 15, 1966

3,234,654
OPTICAL DEVICE FOR CHECKING
ACCURACY OF SHAPE
Clifford Charles Barber, Chingford, London, England, assignor to National Research Development Corporation, London, England, a British corporation
Filed Dec. 3, 1959, Ser. No. 857,039
9 Claims. (Cl. 33—174)

This invention relates to a method and apparatus for comparing the profile of a workpiece with a standard profile.

According to the present invention, a profile may be compared by preparing a trace upon a movable, markable surface, which trace represents the tracking of a standard profile by a feeler; and then viewing the trace by optical magnifying means disposed at a fixed location with its optical axis intersecting the trace at any given point during movement of the surface, the position of the surface and trace being now determined by tracking the profile of a workpiece with the same feeler. Variations of the profile would be determined by an apparent weaving and deviation of the trace from the optical axis of the optical means.

Apparatus according to the invention comprises a feeler for tracking the profile; a body including a markable surface, which body is operably connected to the feeler so as to be moved by a tracking of the feeler against a standard profile; and a scriber having a fine marking tip. A holder is provided for holding the scriber at a fixed location during tracking of the profile, with the tip of the scriber in contact with the movable surface such that movement of the surface past the scriber will cause the latter to make a fine trace representing the profile upon the surface. The apparatus also includes optical means for viewing the trace on an optical axis passing through the point which the scriber tip occupied in making the trace, such that subsequent tracking by the feeler of a workpiece profile will cause a magnified image of at least part of the trace, at any instant, to appear to weave through or deviate from said optical axis. The making of the trace and subsequent comparing of a profile on such an apparatus permits cancellation of characteristics of the machine which would otherwise lead to inaccuracies.

Provision may also be made for more clearly defining the fine point upon the optical axis by means of a suitable marking, cross-line graticule or tolerance lines.

Both the scriber and optical means may be carried upon a movable carrier arranged so that one or other of these can be brought into its correct position by movement of the carrier. The carrier may be in the form of a slide, with the scriber and optical means being mounted on different parts of the slide. Suitable provision is also made for retracting the scriber into and out of contact with the markable surface.

The trace may be marked by any suitable means, for example a pen, pencil or by a scriber acting on a smoked or otherwise suitably coated plate, by the exposure of a photographic surface by means of a small point of light, or by a point application of the electrostatic process known as Xerography, the surface preferably being that of a translucent plate in order that a sharp and well illuminated trace can be produced by shining a powerful light through the plate, the trace, of course, in any one of such arrangements, constituting or in effect constituting the locus of the particular marking point used. It will, therefore, be appreciated that the marking point would not necessarily be an actual pen, pencil or scriber, as it could, for example, be a spot of light. In some cases, the translucent plate can be coated with an opaque or partially opaque substance such that a line can be scribed through it, but this will give a light trace on a dark background. On the other hand, when a pen or pencil is used on a translucent plate, the trace will be dark upon a light background. When the trace is made photographically, it may, for some requirements, be necessary for a positive to be produced.

From the foregoing description, it will be understood that the invention is not limited to the production of traces which are similar to the standard profile or to apparatus for producing such traces as in all cases the shape of the trace would be determined by the characteristics of any given apparatus, and it would, of course be possible to construct an apparatus which would produce a trace entirely dissimilar to the standard profile, although bearing a relationship to this.

Examples of apparatus according to the invention will now be described with reference to the accompanying diagrammatic drawings, of which:

FIGURE 1 is a plan view of one form of apparatus according to the invention.

FIGURE 2 is a similar view of a modification of the apparatus shown in FIGURE 1.

FIGRE 6 is a plan view, to a larger scale, showing a modified detail.

Figure 7:
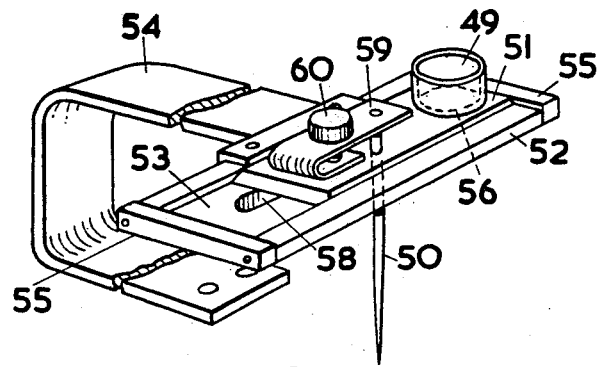

FIG. 7 shows a means for mounting the scriber and optical means.

Figure 8:
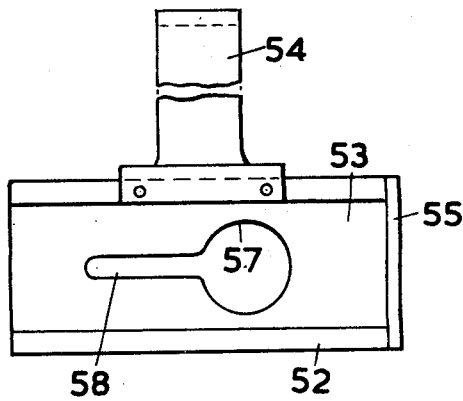

FIG. 8 is a partial plan view of the mounting means.

As shown in FIGURE 1 of the drawings, 1 indicates a table mounted, by four grooved rollers 2, upon guide rails 3, 3, in turn carried upon a table 4, mounted by four grooved rollers 5, upon guide rails 6, 6, arranged at right angles to the rails 3, 3, and which rails 6, 6, are carried upon a baseplate 7, the arrangement being such as to constrain the table 1 to move in either direction along an X axis and Y axis, as shown by the correspondingly marked arrows. The table 1 is provided with a handle 8 to permit it to be moved in this manner.

Carried by the baseplate 7 is a feeler 9 having a part-spherical head 10. A scriber 11 is carried by a bracket 11a mounted upon the baseplate 7.

A sample or standard article 12 may be fixed to the table 1 so that its outline can be tracked around by the head 10 of the feeler 9 upon suitable movement being imparted to the table 1 through the handle 8, the broken line 13 indicating what is, in effect, the path of movement of the centre of the head 10 during this relative tracking movement, although, of course the feeler in fact remains stationary. Also fixed upon the table 1, but placed beneath the scriber 11, is a transparent plate 14 the upper surface of which is smoked or otherwise suitably coated so that during the aforesaid movement of the table 1 to cause relative tracking movement between the standard article or master 12 and the feeler head 10, the scriber 11 will scribe a trace 15 through this coating. In this particular arrangement, the trace produced by the scriber will be (within the limits of accuracy of the apparatus) identical with the path of movement 13 of the centre of the feeler head 10.

From the foregoing description it will be readily appreciated that should the article 12 be repeatedly retracked by the feeler head 10 after the trace has been made, the trace will always appear to weave immediately beneath the scriber point. If, however, the standard article 12 be replaced by a like article or workpiece, the trace will only appear to weave beneath the scriber point if the workpiece is of identical dimensions with those of the standard article, and, to any extent that the dimensions of a workpiece may differ from those of the standard article, to that extent will the trace appear displaced from the scriber point.

Although it is essential for the trace to bear a relationship to the standard article, it is not necessary for it to be similar, as will be seen upon reference to FIGURE 2 in which table 16 upon a base plate 17 and having a handle 18, instead of being mounted to be constrained to move along an X axis and a Y axis, as previously described, is coupled to a fixed body 19 by a linkage 20, 21. A feeler 22 having a feeler head 23 is fixed to the base 17, as is also a bracket 24 carrying a scriber 25. The table is adapted to carry a standard article 26, so that when this table is appropriately swung upon its linkage a tracking contact takes place between the edge of this article and the feeler head 23, the broken line 27 indicating the path which would in effect be taken by the center of this head. Thus, when a transparent plate 28 is carried upon the table, the scriber 25 will scribe a trace 29.

Figure 3:
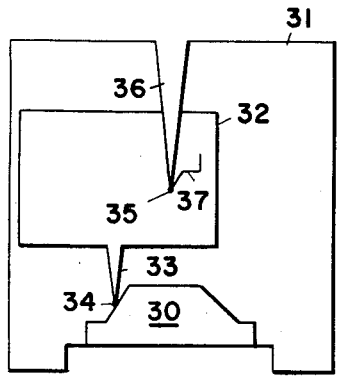
FIGURES 3 and 4 are plan views of an alternative form of the apparatus.
Figure 4:
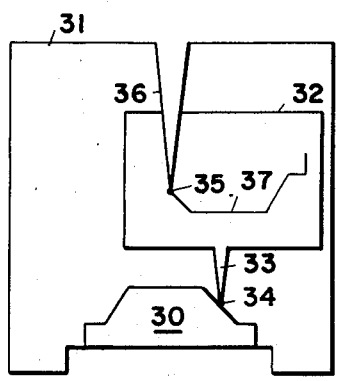

In the form of apparatus shown in FIGS. 1 and 2, the feelers 9 and 22, respectively, have been fixed so that the standard article and workpiece would be moved relatively to them. It is, however, found preferable for the workpiece to be fixed, and such an arrangement is shown in FIGS. 3 and 4, in which 30 indicates the standard article, which is fixed to a base plate 31 carrying the movable plate 32, which plate is arranged to move along an X axis and a Y axis and has a feeler 33 with a head 34 which engages with and tracks along the edge of the standard article so that a scriber 35, carried by a bracket 36 fixed to the said base plate, will make a trace 37 upon the plate 32. In such an arrangement, the trace 37 will again correspond to the path of the center of the feeler head 34 around the profile of the article 30. Instead of the plate 32 and feeler 33 being constrained to move along an X and Y axis, they may be carried upon any suitable linkage, for example one similar to that shown in FIG. 2.

Figure 5:
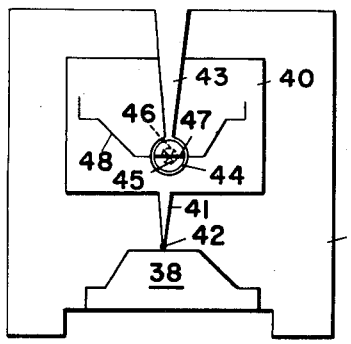
FIGURE 5 is a plan view of a modification of the apparatus shown in FIGURES 3 and 4.

Preferably, in all forms of the apparatus according to the invention, optical means are provided for magnifying at least a part of the trace, in order to show whether during testing of the workpiece, this trace will weave through or deviate from a point representing that of the scriber, and in FIG. 5 is shown an arrangement similar to that described with reference to FIGS. 3 and 4, insofar as the standard article 38, the base plate 39 to which this is attached, the plate 40, the feeler 41 and the feeler head 42 are all concerned. In this arrangement, there is substituted for the bracket 36 of the arrangement shown in FIGS. 3 and 4 a bracket 43. This bracket 43 is provided with an eyepiece 44 carrying a cross-line graticule 45 and a concentric tolerance circle 46. The intersection of the cross-line graticule 45 represents the scriber point, and the thickened line 47 a magnified portion of a trace 48, which, as shown in FIG. 5, passes through the center of the graticule 46 as it would in the event of either a standard article being tracked or a perfect workpiece.

Figure 6:
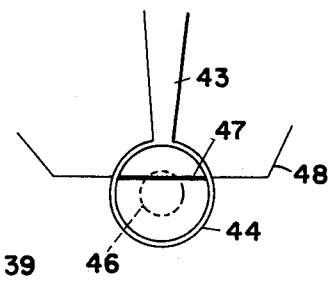

In some cases, the cross-line graticule 45 may be omitted and only a tolerance circle 46 used, as shown on an enlarged scale in FIG. 6.

In the arrangement just described, the optical eye piece 44 has been described as carried by the bracket 43, but this bracket may also be capable of carrying the scriber, although in cases where it may be desired to remove the scribed this may be removably attached to the bracket. The eyepiece may also be capable of being removed, or the arrangement may be such as to permit the eyepiece and scriber to be substituted for each other, so that, if a trace has been made, the scriber may be removed and the eyepiece placed upon the bracket. Suitable provision would, of course be made to ensure that, in the case of either the scriber or eyepiece being removable they would be accurately positioned when replaced.

In an alternative arrangement for accurately effecting this substitution, an eyepiece 49 and a scriber 50 are both mounted on a slide 51 carried in a strip 52 slotted to form a guideway 53 and supported in a bracket 54 which would be fixed upon the base plate. The guideway 53 is at each end provided with a stop 55 arranged so that, when the slide 51 is moved against one of these stops 55, the scriber 50 is in position, and when the slide 51 is moved against the other stop 55, the eyepiece 49 is in position. The slide 51 and the strip 52, in which the said guideway is formed, are provided, respectively, with perforations 56, 57, the perforation 56 being shown in FIG. 7 in broken lines, and the perforation 57 being shown in FIG. 8 (which is a plan view with one of the stops 55 and the slide 51 removed), the arrangement being such that these perforations will be in register on the optical axis when the eyepiece 49 is in position. Leading into the perforations 57 of the strip 52 is a slot 58 for the passage of the scriber 50, which scriber is at its upper end carried in one limb of a substantially U-shaped member 59, made of resilient material and carried upon the slide 51. The scriber 50, which freely passes through the slide 51, may be lowered and raised by rotation of a thumb-screw 60, which causes one limb of the U-shaped member 59 to be flexed toward or away from the lower limb of this member, according to the direction in which the thumb-screw is rotated.

It is of course understood that the forms of the invention described represent a preferred embodiment, and that many other forms or variations may be practiced and yet remain within the spirit of my invention and the scope of the subjoined claims.

I claim:

1. Apparatus for comparing the profile of a workpiece with a standard profile, comprising a stationary base plate; a movable body carrying a marking surface and mounted for co-ordinate movement relative to said base plate; a standard profile; a feeler for engaging and tracking the standard profile upon relative movement therewith; said standard profile being removably mounted on one of said base plate and said movable body, said feeler being mounted on the other one of said base plate and said movable body so as to be movable relative to said standard profile, whereby said movable body can follow a path determined by the relative tracking movement of said feeler along said standard profile; a scribed having a fine marking tip, and means for removably holding the scriber in a fixed position relative to said base plate with said tip in contact with said marking surface for marking a trace thereon; optical magnifying means including an optical axis, and means for removably mounting the optical means in a fixed position relative to said base plate such that the axis intersects the marking surface at the same point at which the marking tip contacts the marking surface when said scriber is held in said fixed position; and means for comparing the position of any portion of the trace relative to the point of intersection of said optical axis with the marking surface upon movement of the movable body during tracking by the feeler of the profile of a workpiece mounted identically as said standard profile.

2. Apparatus according to claim 1 and further comprising a fixed bracket supporting both the scriber holding means and the optical mounting means; and means for interchanging the scriber holding means and optical mounting means at the same fixed position.

3. Apparatus according to claim 2 wherein the interchanging means comprises a slide carrier movable between two terminal positions in a guideway defined by the bracket, the scriber being held by one part of the slide carrier and the optical means being mounted on another part; and stop means for locating the carrier at the terminal positions, wherein the scriber is held at the fixed position at one of the terminal positions and the optical means is at the fixed position at the other of the terminal positions; and means for retracting the tip of the scriber when the optical means is at the fixed position.

4. Apparatus according to claim 3 wherein the retracting means comprises a U-shaped spring, one limb of which supports the scriber, and screw means for altering the distance between the two limbs of the spring.

5. Apparatus for comparing the profile of a workpiece with a standard profile comprising a stationary base plate; a movable body carrying a marking surface; means releasably mounting a standard profile in a predetermined position on said body for movement therewith; a stationary feeler fixed to said base plate for engaging and tracking the standard profile upon movement of the body and standard profile; a scriber having a fine marking tip and means for removably holding the scriber in a fixed position relative to said base plate with said tip in contact with the marking surface for marking thereof; means for moving the body and standard profile to track the standard profile with the feeler and mark a trace on the marking surface representing the standard profile; optical magnifying means including an optical axis and means for removably mounting the optical means in a fixed position with the axis intersecting the marking surface at the same point at which the tip contacts the marking surface when said scriber is held in said fixed position; and means for comparing the position of any portion of the trace in relation to the point of the optical axis upon movement of the body by engagement with the feeler and tracking of the profile of a workpiece mounted in the predetermined position on the body.

6. Apparatus for comparing the profile of a workpiece with a standard profile comprising a stationary base plate; means releasably mounting a standard profile in a predetermined and fixed position relative to said base plate; a movable body carrying a marking surface; a feeler fixed to said body for engaging and tracking the standard profile upon movement of the body and corresponding movement of the feeler; a scriber having a fine marking tip and means for removably holding the scriber in a fixed position relative to the base plate with said tip in contact with the marking surface for marking thereof; means for moving the body and feeler to track the standard profile and mark a trace on the marking surface representing the standard profile; optical magnifying means including an optical axis and means for removably mounting the optical means in a fixed position with the axis intersecting the marking surface at the same point at which the tip contacts the marking surface when said scriber is held in said fixed position; and means for comparing the position of any portion of the trace in relation to the point of the optical axis upon movement of the body and feeler by engagement and tracking of the profile of a workpiece mounted in the predetermined fixed position of the standard profile.

7. Apparatus according to claim 6 and further comprising a fixed bracket supporting both the scriber holding means and the optical mounting means; and means for interchanging the scriber holding means and optical mounting means at the same fixed position.

8. Apparatus according to claim 7 wherein the interchanging means comprises a slide carrier movable between two terminal positions in a guideway defined by the bracket, the scriber being held by one part of the slide carrier and the optical means being mounted on another part; and stop means for locating the carrier at the terminal positions, wherein the scriber is held at the fixed position at one of the terminal positions and the optical means is at the fixed position at the other of the teminal positions; and means for retracting the tip of the scriber when the optical means is at the fixed position.

9. Apparatus according to claim 8 wherein the retracting means comprises a U-shaped spring, one limb of which supports the scriber, and screw means for altering the distance between the two limbs of the springs.

References Cited by the Examiner

UNITED STATES PATENTS

| 476,186 | 5/1892 | Clegg | 33—23 |
|---|---|---|---|
| 676,326 | 6/1901 | Kutzbach | 33—23 |
| 2,451,155 | 10/1948 | De Boer | 33—174 X |
| 2,476,312 | 7/1949 | Luety | 33—174 X |
| 2,621,556 | 12/1952 | Beardsley et al. | 33—174 |
| 2,622,371 | 12/1952 | Zuiderhoek | 33—174 X |
| 2,707,321 | 5/1955 | Dreisch | 33—174 X |
| 2,852,976 | 9/1958 | Hoffman | 88—14 |
| 2,859,659 | 11/1958 | Fenske | 88—26 |

FOREIGN PATENTS

| 724,162 | 2/1955 | England. |
|---|---|---|
| 811,465 | 4/1959 | England. |
| 63,667 | 9/1955 | France. |
| 1,196,434 | 11/1959 | France. |
| 479,504 | 3/1953 | Italy. |

LOUIS R. PRINCE, *Primary Examiner.*

LEONARD FORMAN, ISAAC LISANN, *Examiners.*